(12) United States Patent
Carlsgaard et al.

(10) Patent No.: US 7,561,777 B2
(45) Date of Patent: Jul. 14, 2009

(54) METHOD AND APPARATUS FOR SIMULTANEOUS RECORDING AND DISPLAYING TWO DIFFERENT VIDEO PROGRAMS

(75) Inventors: Eric Stephen Carlsgaard, Zionsville, IN (US); Thomas Edward Horlander, Indianapolis, IN (US)

(73) Assignee: Thomson Licensing, Boulogne-Billancourt (FR)

(*) Notice: Subject to any disclaimer, the term of this patent is extended or adjusted under 35 U.S.C. 154(b) by 1034 days.

(21) Appl. No.: 10/204,575

(22) PCT Filed: Mar. 13, 2001

(86) PCT No.: PCT/US01/08142
§ 371 (c)(1),
(2), (4) Date: Aug. 22, 2002

(87) PCT Pub. No.: WO01/72036
PCT Pub. Date: Sep. 27, 2001

(65) Prior Publication Data
US 2003/0020832 A1    Jan. 30, 2003

Related U.S. Application Data

(60) Provisional application No. 60/190,378, filed on Mar. 17, 2000.

(51) Int. Cl.
*H04N 7/00*   (2006.01)
*H04N 5/91*   (2006.01)
*H04N 9/00*   (2006.01)
*H04N 5/45*   (2006.01)
*H04N 5/445*  (2006.01)

(52) U.S. Cl. ............................. 386/95; 386/1; 386/46; 386/125; 386/126; 348/564; 348/565

(58) Field of Classification Search ................ 348/564, 348/565, 555; 386/1, 46, 95, 125–126
See application file for complete search history.

(56) References Cited

U.S. PATENT DOCUMENTS 4,890,168 A    12/1989  Inoue et al. ............... 358/335

(Continued)

FOREIGN PATENT DOCUMENTS

EP    0847197     6/1998
KR    1999-0069985  *  9/1999

*Primary Examiner*—Thai Tran
*Assistant Examiner*—Daquan Zhao
(74) *Attorney, Agent, or Firm*—Robert D. Shedd; Joseph J. Opalach; Catherine A. Ferguson (57) ABSTRACT

A method and apparatus for simultaneously recording and displaying video signals from two different video sources. The apparatus comprises a main channel processing circuit/logic, a second channel processing circuit/logic, and common circuitry/logic. The common circuitry comprises a digital video encoder pipe that decodes both a first and second encoded video signals. The main channel processing circuit processes a first decoded video signal utilizing a first clock to form a main picture for display. The second channel processing circuit processes a second decoded video signal to form a PIP picture for combination with the main picture for display. The PIP picture is produced using a second clock signal that is independent from the first clock signal. In a record mode, the second channel clock is coupled to the second channel processing circuit to produce a recordable signal using a digital encoder. The recordable signal also forms the PIP picture that is coupled to the main channel processing circuit to produce a PIP picture that is used to monitor the recording process.

10 Claims, 4 Drawing Sheets

U.S. PATENT DOCUMENTS

| | | | |
|---|---|---|---|
| 5,285,265 A | 2/1994 | Choi | 348/565 |
| 5,477,397 A * | 12/1995 | Naimpally et al. | 386/123 |
| 5,559,562 A | 9/1996 | Ferster | 348/584 |
| 5,598,222 A | 1/1997 | Lane | 348/568 |
| 5,787,223 A * | 7/1998 | Faryar et al. | 386/46 |
| 5,847,771 A * | 12/1998 | Cloutier et al. | 348/564 |
| 5,969,768 A | 10/1999 | Boyce et al. | 348/565 |
| 6,025,884 A | 2/2000 | Choi | 348/565 |
| 6,141,062 A * | 10/2000 | Hall et al. | 348/584 |
| 6,285,408 B1 * | 9/2001 | Choi et al. | 348/555 |
| 2001/0007576 A1 | 7/2001 | Lyu | 375/240.25 |

* cited by examiner

| COMBINATIONS | V PIXELS | INT/PROG | VTOTAL | V FREQ (Hz) | H FREQ (kHz) | PIXEL FREQ (MHz) | H PIXELS | H TOTAL |
|---|---|---|---|---|---|---|---|---|
| MAIN (60Hz) | 1080 | INT | 1125 | 60.000000 | 33.750000 | 74.250000 | 1920 | 2200 |
| RECORD (60Hz) | 480 | INT | 525 | 60.000000 | 15.750000 | 13.513500 | 720 | 858 |
| MAIN (60Hz) | 1080 | INT | 1125 | 60.000000 | 33.750000 | 74.250000 | 1920 | 2200 |
| RECORD (~60Hz) | 480 | INT | 525 | 59.999100 | 15.749764 | 13.513297 | 720 | 858 |
| MAIN (~60Hz) | 1080 | INT | 1125 | 60.000900 | 33.750506 | 74.251114 | 1920 | 2200 |
| RECORD (60Hz) | 480 | INT | 525 | 60.000000 | 15.750000 | 13.513500 | 720 | 858 |
| MAIN (~60Hz) | 1080 | INT | 1125 | 60.000900 | 33.750506 | 74.251114 | 1920 | 2200 |
| RECORD (~60Hz) | 480 | INT | 525 | 59.999100 | 15.749764 | 13.513297 | 720 | 858 |
| MAIN (60Hz) | 720 | PROG | 787.5 | 60.000000 | 47.250000 | 74.1825 | 1280 | 1570 |
| RECORD (60Hz) | 480 | INT | 525 | 60.000000 | 15.750000 | 13.513500 | 720 | 858 |
| MAIN (60Hz) | 720 | PROG | 787.5 | 60.000000 | 47.250000 | 74.1825 | 1280 | 1570 |
| RECORD (~60Hz) | 480 | INT | 525 | 59.999100 | 15.749764 | 13.513297 | 720 | 858 |
| MAIN (~60Hz) | 720 | PROG | 787.5 | 60.000900 | 47.250709 | 74.1836127 | 1280 | 1570 |
| RECORD (60Hz) | 480 | INT | 525 | 60.000000 | 15.750000 | 13.513500 | 720 | 858 |
| MAIN (~60Hz) | 720 | PROG | 787.5 | 60.000900 | 47.250709 | 74.1836127 | 1280 | 1570 |
| RECORD (~60Hz) | 480 | INT | 525 | 59.999100 | 15.749764 | 13.513297 | 720 | 858 |

METHOD AND APPARATUS FOR SIMULTANEOUS RECORDING AND DISPLAYING TWO DIFFERENT VIDEO PROGRAMS

This application claims the benefit under 35 U.S.C. § 365 of International Application PCT/US01/08142, filed Mar. 13, 2001, which was published in accordance with PCT Article 21(2) on Sep. 27, 2001 in English; and which claims benefit of U.S. provisional application Ser. No. 60/190,378 filed Mar. 17, 2000.

BACKGROUND OF THE DISCLOSURE

1. Field of the Invention

The invention relates to televisions and, more particularly, the invention relates to signal processing techniques for simultaneously recording and displaying two video programs.

2. Description of the Background Art

Television viewers have come to desire to simultaneously record and view programs from two different video sources, e.g., a satellite television program and a standard terrestrial broadcast program. However, various video sources produce video signals that have different horizontal and vertical synchronization rates. As such, two separate video decoder and display generation systems are used to facilitate viewing one program, while producing an output signal of another program that can be recorded as well as viewed in a picture-in-picture (PIP) display. Such a system requires the hardware of two television receivers. As such, a television with such a capability is very expensive.

Therefore, a need exists in the art for a television having a single video decoder system that is capable of displaying a main picture from a first video signal plus producing a recordable signal from a second video signal as well as producing a PIP picture for monitoring the recordable signal.

SUMMARY OF THE INVENTION

The disadvantages associated with the prior art are overcome by a method and apparatus for simultaneously recording and displaying video signals from two different video sources. The apparatus comprises a main channel processing circuit for a main signal, a second channel processing circuit for a second signal, and common circuitry for processing both the main and second signals. The common circuitry includes a digital video variable length pipe and a decode pipe that decodes both the main and second digitally encoded (compressed) video signals.

The main channel processing circuit processes a main video signal to form a main picture for display. The second channel processing circuit processes a second video signal that, when selected for recording also forms a PIP picture for combination with the main picture for display. The second channel processing circuit also processes the main video signal that, when selected for recording, also forms a PIP picture for combination with the main picture for display. In this manner, the PIP forms a record monitor.

The main decoded video signal or the second decoded video signal is also presented to a record output to which a recorder may be coupled to receive the selected first or second decoded video signal for recording.

During the decoding process, the main channel processing circuit and the second channel processing circuit utilize a main clock signal that is derived from the main signal (the faster of the clocks). During recording either the main clock signal or a second clock signal that is independent from the main clock signal is utilized to provide clocking for a record out signal and the record monitor PIP.

When the main signal is being recorded (and providing a PIP), a Vmain signal from a main raster generator is utilize to drive a digital encoder (DENC) in a Vslave mode for the record out. When the second signal is being recorded, the DENC receives a start-up reset in order to read in the second signal vertical rate parameters and the vertical sync is generated by the DENC itself.

In PIP only-mode (record switch off), the main signal clock is used for the second channel. In the record mode, either the main signal clock or the second signal clock is used depending on whether the same or different source is being recorded, respectively. In the record mode, the video is sent to the graphics processor for capture and display as well as forwarded to the DENC for recording. The captured pictures are then retrieved without additional reformatting for display as a "record monitor" PIP image. This PIP image is preferably somewhat larger that a standard PIP image and is also preferably labeled a record monitor PIP. Because the record pictures are being reproduced based on the record output timing, it may be necessary to skip or repeat pictures when presented as a PIP overlay on the main signal output.

In one form, since there is only one VCXO generated reference clock based on the video decode process, the second signal uses a clock that is derived from the main signal clock, is but different as needed (for example, 81 MHz for a 60 Hz main, and 27 MHz for a 59.95 Hz record). Because the studio clock used for the video of the second signal may deviate slightly from the studio clock of the video for the first signal, a form of clock recovery is required for the second signal. If the second signal video is derived from an analog source, then the buffer level of captured pictures is used as an indication of whether the DENC clock is running too fast or too slow. When the second signal is digital, then a local counter is sampled based on the arrival time of clock reference bearing transport packets. A comparison between the sampled clock and delivered clock reference is used as an indication of whether the DENC clock is running too fast or too slow. A PLL (Phase-Locked Loop) and programmable divider are used to generate the second signal clock, using the main signal recovered time base as the recovered time base as the reference. The PLL divider is altered as necessary to align the generated clock with the ideal frequency for the second signal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
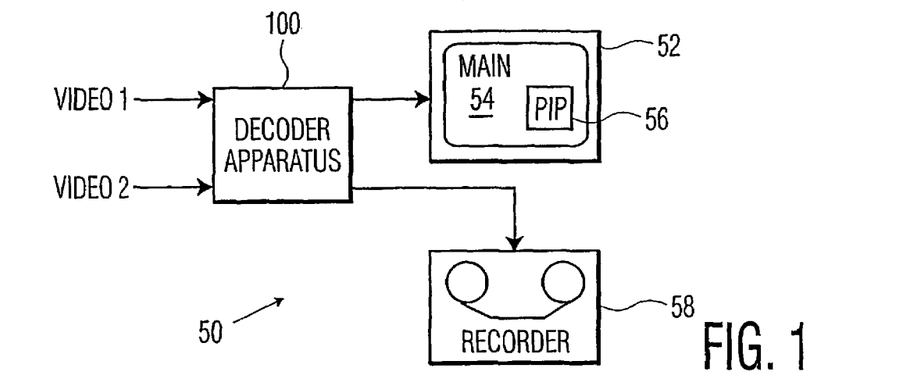
FIG. 1 depicts a block diagram of one form of a video processing system in accordance with the principles of the present invention.

Referring to FIG. 1 there is depicted a block diagram of a video processing system, generally designated 50, operable to receive, decode, record, and/or display a plurality of video signals from different video sources. In particular, the system 50 is principally concerned with the decoding and/or processing a pair of video signals (video 1 and video 2) that are coupled to the system 50. Each video signal may be an analog or digital signal. Thus, the term "decoding" as used herein includes processing/decoding in the case of an analog signal, and uncompressing/decoding in the case of a digital signal (i.e. a digitally encoded video signal).

In the case of a digital signal, the system 50 uses a decoder that processes a pair of digital signals or alternatively a pair of decoders, one for each signal. Further, while any digital encoding format may be decoded, the present invention will be discussed in terms of signals that have been encoded using the Moving Pictures Expert Group (MPEG) standard. These signals may be supplied by a satellite television receiver, a high definition television (HDTV) receiver, digital cable receiver, digital cable television system, digital terrestrial television antenna, and the like. In the case of an analog signal, any analog format such as NTSC, PAL, SECAM, or the like may be decoded by the system 50. Thus, while any analog format may be decoded, the present invention will be discussed in terms of signals that have been encoded using the NTSC standard. These signals may be supplied by a television receiver, cable receiver, cable television system, terrestrial television antenna, a television components, and the like.

The system 50 comprises a decoder apparatus 100 a display 52 (e.g., a television, television monitor or the like), and a recorder 58 (e.g., a video cassette recorder (VCR), video tape recorder (VTR), digital recorder, or the like). In the system 50, each above referenced component, i.e. the decoder apparatus 100, the display 52, and the recorder 58, are separate components and are coupled to each other by patch cords or other suitable conductors/connectors. The decoder apparatus 100 decodes both of the video signals using common decoding circuitry and dual timing circuitry to produce a signal for a main picture 54 (e.g., from video 1) and a signal for recording on the recorder 58 as well as for display in a PIP picture 56 of the main picture 54 of the display 52. As such, the system 50 simultaneously produces a video signal for display and for recording as well as the capability to monitor the recordable signal in a PIP picture. By using common circuitry to process two video signals, the decoder apparatus is less expensive to manufacture than prior art decoder apparatus. As well, the present invention utilizes independent clock recovery/generation circuitry in addition to the common decoding circuitry, to provide clocking for the main video and the record/PIP video.

Figure 1A:
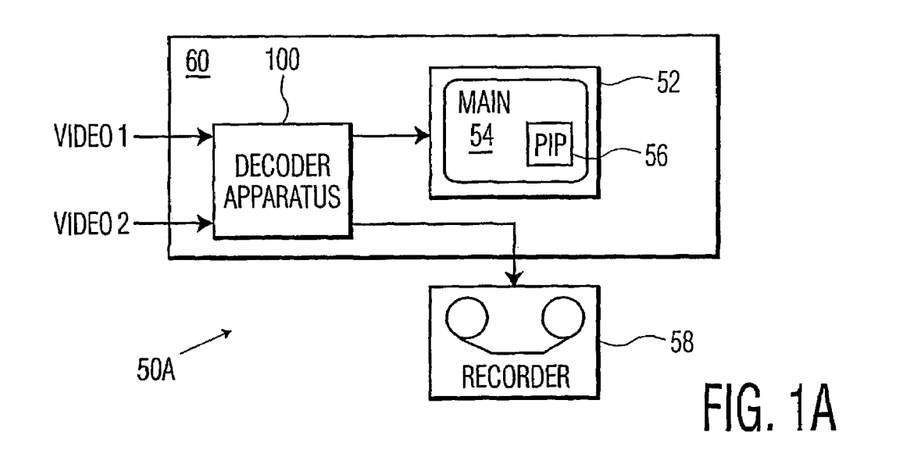
FIG. 1A depicts a block diagram of another form of a video processing system in accordance with the principles of the present invention.

Referring to FIG. 1A, there is depicted another form of a video processing system in accordance with the principles of the present invention as set forth herein, generally designated 50A, that operates and/or functions in the same manner as the video processing system 50 of FIG. 1 of which the operation/function is described in detail below. The system 50A includes the decoder apparatus 100, a display 52 (e.g. a television, television monitor or the like), and the recorder 58. However, in the system 50A, the decoder apparatus 100 is integral with the display 52 as a component 60, while the recorder 58 is a separate component. The recorder 58 is coupled to the integral component 60 by a patch cord or other suitable conductor/connector.

Figure 1B:
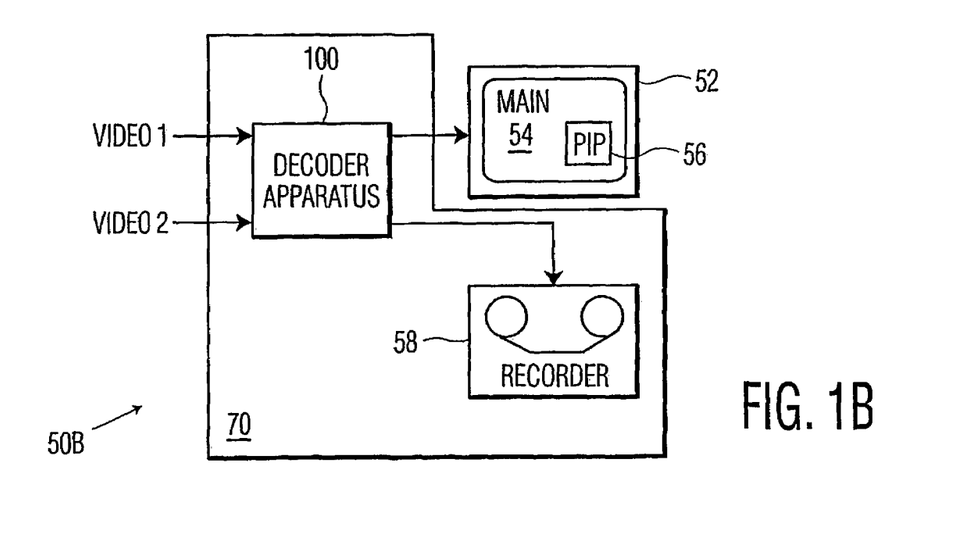
FIG. 1B depicts a block diagram of yet another form of a video processing system in accordance with the principles of the present invention.

Referring to FIG. 1B, there is depicted yet another form of a video processing of a video processing system in accordance with the principles of the present invention as set forth herein, generally designated 50B, that operates and/or functions in the same manner as the video processing system 50 of FIG. 1 of which the operation/function is described in detail below. The system 50B includes the decoder apparatus 100, a display 52 (e.g. a television, television monitor or the like), and the recorder 58. However, in the system 50B, the decoder apparatus 100 is integral with the recorder 58 as a component 70, while the display 52 is a separate component. The display 52 is coupled to the integral component 70 by a patch cord or other suitable conductor/connector.

Figure 2:
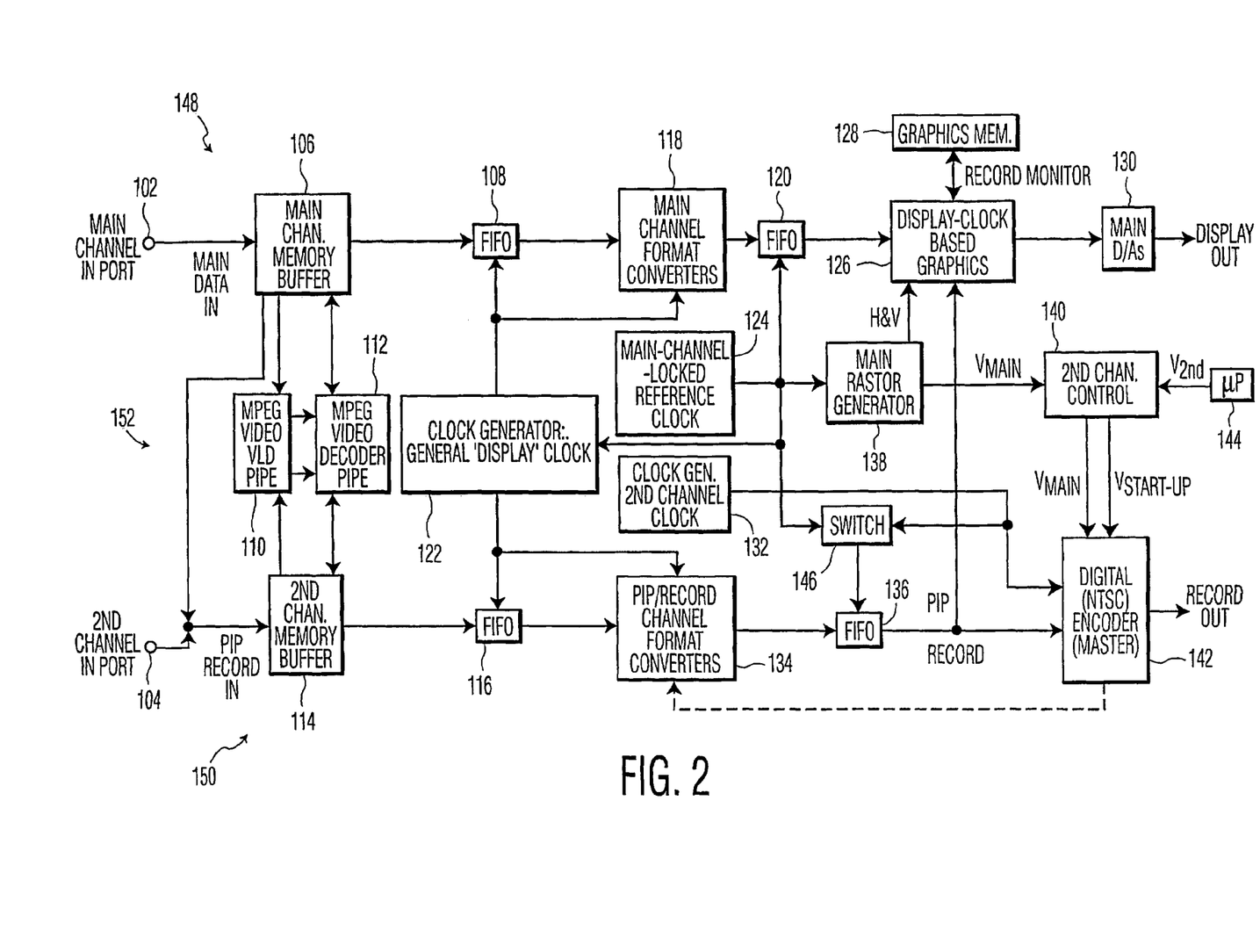
FIG. 2 depicts a detailed block diagram of a video decoder apparatus utilizable in the systems of FIGS. 1, 1A, and 1B in accordance with the principles of the present invention.

Referring now to FIG. 2, there is depicted a detailed block diagram of the decoder apparatus 100 of FIGS. 1, 1A, and 1B. The decoder apparatus 100 comprises main channel processing circuitry/logic 148, second channel processing circuitry/logic 150, and common circuitry/logic 152. The main channel processing circuitry/logic 148 is coupled to a main channel in port 102 such that the main channel processing circuitry/logic 148 receives a main channel or signal, typically from a main tuner (not shown). The second channel processing circuitry/logic 150 is coupled to a second channel in port 104 such that the second channel processing circuitry/logic 150 receives a second channel or signal, typically from a second tuner (not shown). However, as explained below, the second channel processing circuitry/logic 150 may receive the main signal as a "second channel" for processing when the main signal is selected for recording rather than the second signal.

The main signal or generally, main data, is provided to a Main Data Input to a main channel memory buffer 106, part of the main channel processing circuitry/logic 148. The main signal may be a digital signal or an analog signal, and may constitute video and/or audio. It should be appreciated, however, that the present invention is principally concerned with video and thus the present invention will be discussed in terms of video only. Additionally, the main (video) signal typically constitutes a single channel previously discriminated via the main tuner (not shown) from a plurality of channels.

When the main signal is analog, the main signal is provided to a FIFO (First In First Out) memory or buffer 108. When the main signal is digital, the main signal is provided to an MPEG video VLD (Variable Length Decoder) pipe 110 that decodes the variable length coding of the MPEG signals. The variable length decoded main signal is then provided to an MPEG video decode pipe 112. The MPEG video decode pipe 112 is operable to decode the MPEG coding of the variable length decoded main signal. In accordance with MPEG principles, the MPEG video decode pipe 112 stores decoded MPEG frames of the main signal in the main channel memory buffer 106. The MPEG video decode pipe 112 utilizes some of the previously decoded MPEG frames of the main signal for motion compensation and the like in decoding incoming MPEG main signals from the MPEG video VLD pipe 110, thus the two-headed arrow between the MPEG video decode pipe 112 and the main channel memory buffer 106. The decoded MPEG frames of the main signal are stored in a correct order back in the main channel memory buffer 106.

The second signal is provided to a PIP/Record Input to a second channel memory buffer 114, part of the second channel processing circuitry/logic 150. The second signal may be a digital signal or an analog signal, and may constitute video and/or audio. It should be appreciated, however, that the present invention is principally concerned with video and thus the present invention will be discussed in terms of video only. Additionally, the second (video) signal typically constitutes a single channel previously discriminated via the second tuner (not shown) from a plurality of channels.

When the second signal is analog, the second signal is provided to a FIFO (First In First Out) memory or buffer 116. When the second signal is digital, the second signal is provided to the MPEG video VLD (Variable Length Decoder) pipe 110 that decodes the variable length coding of the MPEG signals. The variable length decoded second signal is then provided to the MPEG video decode pipe 112. The MPEG video. decode pipe 112 is operable to decode the MPEG coding of the variable length decoded second signal. In accordance with MPEG principles, the MPEG video decode pipe 112 stores decoded MPEG frames of the second signal in the second channel memory buffer 114. The MPEG video decode pipe 112 utilizes some of the previously decoded frames of the second signal for motion compensation and the like in decoding incoming MPEG second signals from the MPEG video VLD pipe 110, thus the two-headed arrow between the MPEG video decode pipe 112 and the second channel memory buffer 114. The decoded MPEG frames of the second signal are stored in a correct order back in the second channel memory buffer 114.

The MPEG video VLD pipe 110 is part of the common circuitry/logic 152 and performs the variable length decoding of the main signal and the second signal in an interleaved manner to enable a single VLD decoder to perform variable length decoding of the two video signals (i.e. the main signal and the second signal).

The MPEG video decode pipe 112 is also part of the common circuitry/logic 152 and performs the MPEG video decoding of the main signal and the second signal. Using an interleaving process, the MPEG video decode pipe 112 decodes both of the video signals and returns the decoded video frames to the respective buffers 106 and 114. Since the MPEG video decode pipe 112 is shared by the two video signals, the faster of the two decode rates is used to decode both of the signals, i.e., a 60 Hz decode rate is used over a 59.94 decode rate. If both video signals have the same decode rate, then, of course, the MPEG video decode pipe 112 uses the decode rate of the two signals. In the case where the decode rates are different, the slower input video stream is processed faster than necessary. As such, the decoding process for the slower stream will occasionally stop to ensure that a data underflow condition will not occur in the compressed data buffer (buffer 106 or 114).

The MPEG video decode pipe 112 couples the signal (e.g., video 1) that will form the main picture to the main channel memory buffer 106 and couples the signal (e.g., video 2) that will form the PIP picture and be recorded to the second channel memory buffer 114. The selection of which signal is the main picture and which is the PIP picture is generally accomplished by a viewer through a remote control or other well-known interface (not shown).

The buffer 106 and the buffer 114 are coupled to respective First In First Out (FIFO) memories 108 and 116. The access (read and write) process of both of the FIFO buffers 108 and 116 is controlled by a single clock generator 122. The clock generator 122 produces a clock signal to each FIFO buffer 108 and 116 that is derived from a clock signal that is produced by a reference clock generator 124. The clock signal produced by the reference clock generator 124 is locked to the main channel timing signal.

The output of the FIFO memory buffer 108 is provided to an input of main channel format converters 118 that are clocked by the clock signal-from the clock generator 122. The output of the FIFO memory buffer 116 is provided to an input of PIP/Record channel format converters 134 that are clocked by the clock signal from the clock generator 122. The format converters 134 are labeled as "PIP/Record channel" format converters because the second channel/signal is not always the channel/signal that is being recorded and hence would not be provided as a PIP. When the main channel/signal is chosen for recording, the main channel/signal is provided as a PIP.

The output of each of the converters 118 and 134 is coupled to a respective FIFO memory 120 and 136. These FIFOs buffer the video frames of the respective signals to ensure that the frames are synchronized with the display timing signals. Access to the FIFO 120 is controlled by the reference clock from the main channel locked reference clock generator 124. Access to the FIFO 136 is controlled by either the reference clock from the main channel locked reference clock generator 124 in the case of the main channel being selected for recording, or a second clock from a second channel clock generator 132 in the case of the second channel/signal being selected for recording. The second channel clock generator 132 is keyed to the second channel/signal.

The reference clock signal from the reference clock generator 124 is also coupled to the main raster generator 138. The main raster generator 138 produces the horizontal (H) and vertical (V) synchronization signals that facilitate display of the main picture onto a cathode ray tube or liquid crystal display. The H and V signals are coupled to a display generator 126 for controlling the raster scan of the pixel data. The pixel data to the display generator 126 comes from the FIFO memory 120 (i.e. the main channel/signal) and the FIFO memory 136 (i.e. either the second channel/signal or the main channel/signal, depending on which channel/signal is selected for recording).

Additionally, the display generator 126 produces the on screen graphics that can be recalled from the graphics memory 128 and controls the insertion of the PIP picture into the main picture. The display, comprising on-screen graphics, PIP picture and main picture, is coupled to the main digital-to-analog converters (DACs) 130 that produce an analog display for viewing on a television screen via a display out port or output.

The main raster generator 138 also provides a Vmain signal to a second channel controller 140. The second channel controller 140 also is operable to receive a Vsecond signal from a microprocessor (μP) 144, microcontroller or the like. The second channel controller 140 outputs either the Vmain signal to a digital-to-NTSC encoder 142 or a Vstart-up (reset) signal in response to the receipt of the Vsecond signal from the microprocessor 144 to the digital-to-NTSC encoder 142, depending on which channel/signal (i.e. the main channel/signal or the second channel/signal) is selected for recording. In accordance with an aspect of the present invention, when the main channel/signal is selected for recording (and thus is provided as a record monitor PIP) the Vmain vertical sync signals are provided through the second channel controller 140 to the digital-to-NTSC encoder 142, and when the second channel/signal is selected for recording (and thus is provided as a record monitor PIP) the Vsecond signal triggers the Vstart-up signal which causes the digital-to-NTSC encoder 142 to internally generate the vertical sync signals based on the incoming/second clock and/or frame rate of the second channel/signal.

Depending on whether the second channel/signal or the main channel/signal is selected for recording, the clocking signal for the FIFO memory 136 is controlled through a switch 146. In accordance with an aspect of the present invention, when the second channel/signal is selected for recording, the second channel/signal provided at the port 104 is processed by the second channel processing circuitry/logic 150 or/and the common circuitry/logic 152 and provided to the FIFO memory 136. The switch 146 is caused to select the second clock signal from the second channel clock generator 132 to supply the second clock signal to the FIFO memory 136. The FIFO memory 136 receives frames from the second channel/signal from the PIP/Record channel format converters 134. The rate at which the frames are sent to the FIFO memory 136 from the PIP/Record channel format converters 134 is controlled by the digital-to-NTSC encoder.142 as indicated by the dashed line between the two circuitry/logic blocks. The digital-to-NTSC encoder 142 is also clocked by the second clock signal from the second clock generator 132. The label "Record" between the FIFO memory 136 and the digital-to-NTSC encoder 142 indicates that the record signal is going to the digital-to-NTSC encoder 142. The label "PIP" indicates that the signal is going to the display generator 126 and the graphics memory 128 for output to the main DACs 130 for display as a PIP. At the same time the second signal from the FIFO memory 136 is provided to the graphics generator 126 and the graphics memory 128 and outputted via the main DACs 130 to the display out for display on the display (not shown).

In accordance with another aspect of the present invention, when the main channel/signal is selected for recording, the main processed signal from the main channel memory buffer 106 is caused to be provided to the second channel memory buffer 114 and through the appropriate components to the FIFO memory 136. The FIFO memory 136 is caused to be clocked by the main channel clock from the main channel locked reference clock generator 124 via the switch 146. At the same time, Vmain is provided through the second channel controller 140 to the digital-to-NTSC encoder 142 to provide the vertical sync pulses for the main channel/signal. As well, the digital-to-NTSC encoder 142 receives the main clock signal from the main clock generator 124. The main channel/signal from the FIFO memory 136 is also provided to the display generator 126 and the graphics memory 128 for output as a PIP on the display.

Figure 3:
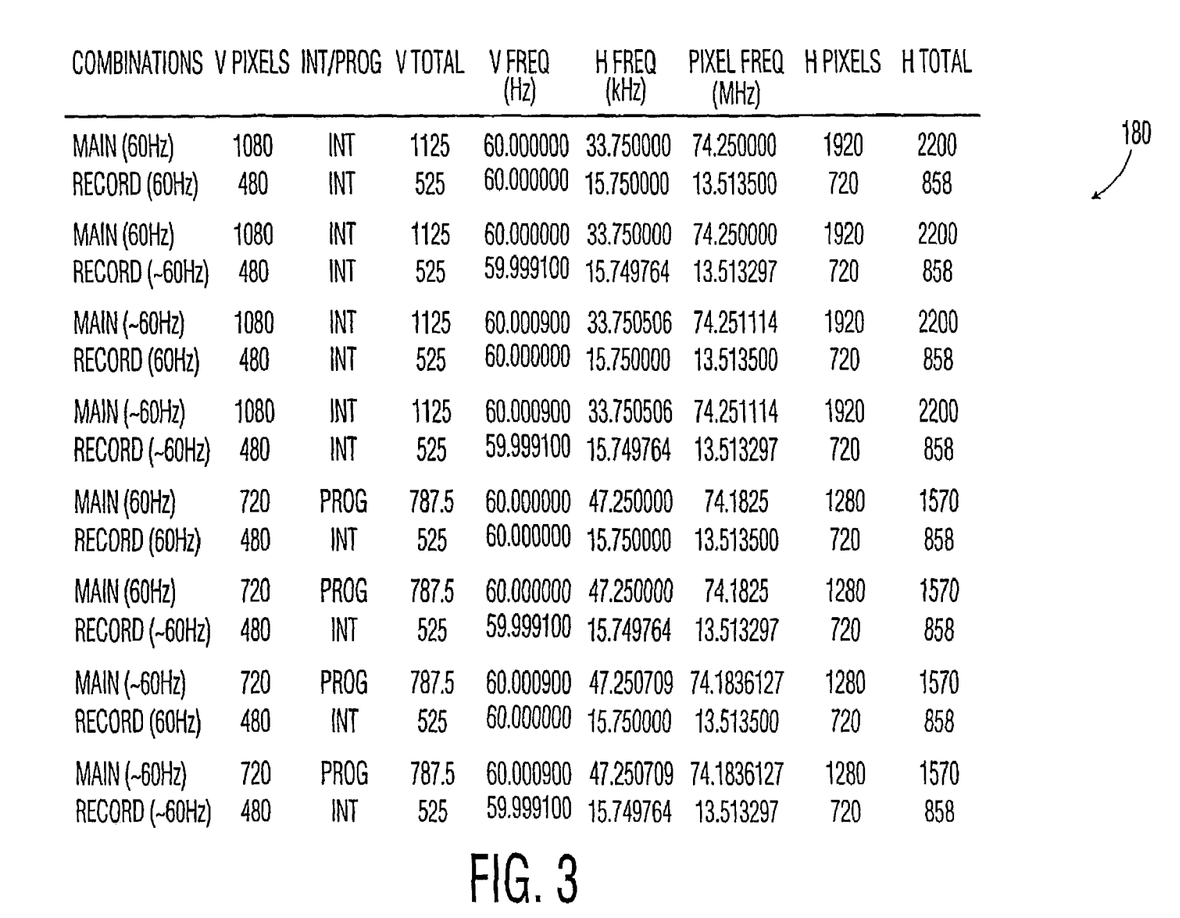
FIG. 3 is a table of exemplary clock frequencies that can be processed and/or generated by the present invention showing various resulting parameters.

In accordance with the principles presented herein, reference is now made to generally designated FIG. 3. In FIG. 3, there is depicted a chart or table, of various exemplary clock frequencies that are generated or produced by the main channel reference clock generator and the second channel reference clock generator to facilitate the output of video signals when their sources may or may not have slightly differencing crystal reference clocks. The various clock frequencies are used by the various components in the manner as described herein.

Operation

Figure 4:
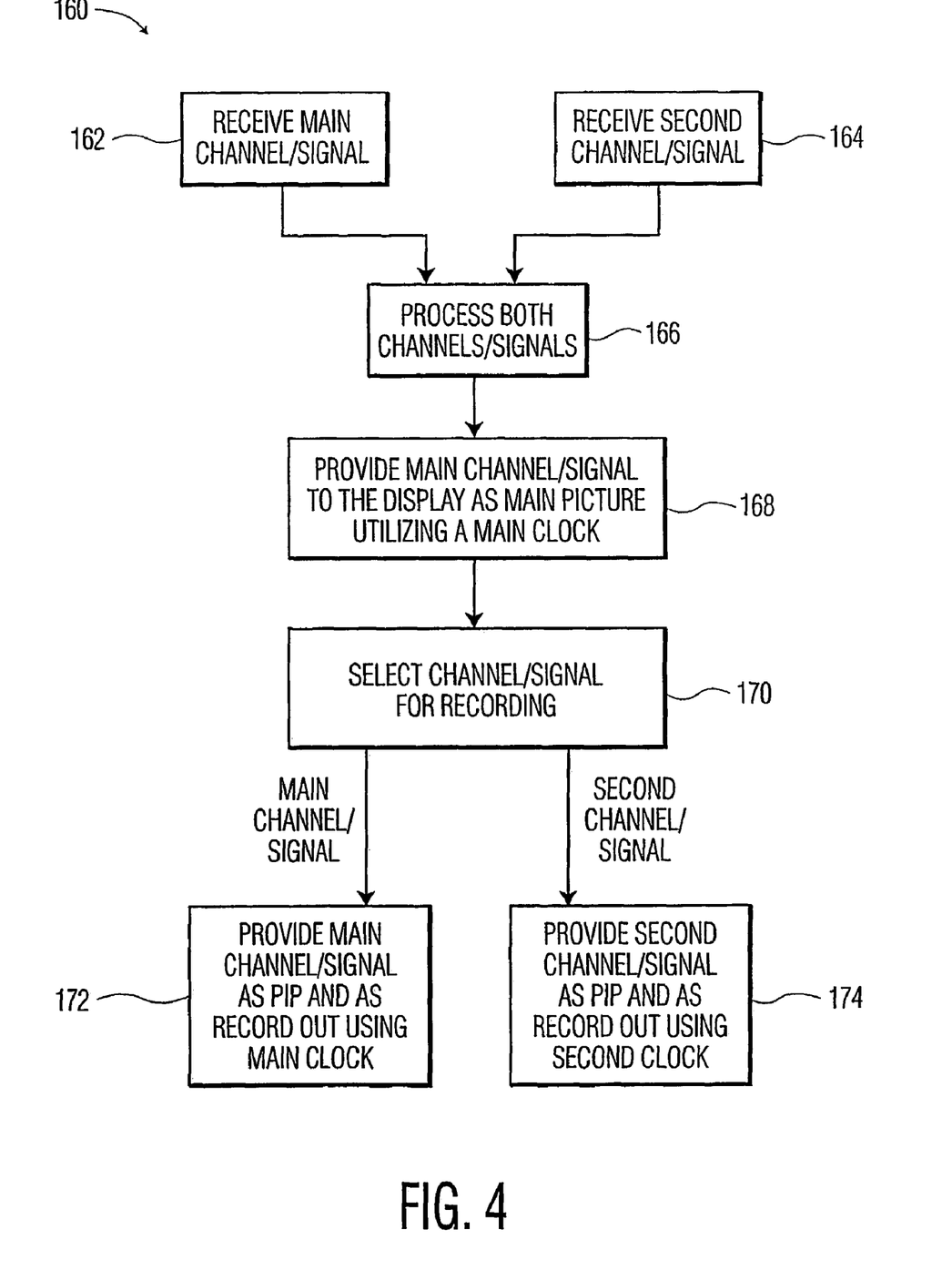
FIG. 4 is a flow chart of an exemplary method in accordance with the principles of the present invention.

Referring to FIG. 4, there is depicted a flow chart generally designated 160, setting forth an exemplary embodiment of a manner of operation of the present invention in accordance with the principles presented herein. It should be initially understood that the order and/or sequence of the manner of operation shown in the flowchart 160 is changeable. As well, all of the steps shown and/or described may or may not be necessary for the operation thereof.

A main channel or signal is received, block 162. As well, a second channel or signal is received, block 164. Thereafter, both the main channel/signal and the second channel/signal are processed, block 166. The main channel/signal is provided to the display as a main picture utilizing a main clock signal derived from the main channel/signal, block 168. A channel/signal (either the main channel/signal or the second channel/signal) is selected for recording, block 170. If the main channel is selected for recording, the main channel is provided as a PIP in the main picture and at a Record Out port or output utilizing the main clock, block 172. If the second channel is selected for recording, the second channel is provided as a PIP in the main picture and at the Record Out port or output utilizing a second clock that is derived independent from the main clock, block 174.

Although various embodiments that incorporate the teachings of the present invention have been shown and described in detail herein, those skilled in the art can readily devise many other varied embodiments that still incorporate these teachings.

The invention claimed is:

1. A method of providing a record monitor on a display comprising the steps of:
    (a) decoding a first video signal from a first video source using a first clock signal having a first frequency;
    (b) decoding a second video signal from a second video source using said first clock signal;
    (c) providing the first decoded video signal as a main picture to a display using the first clock signal; and
    (d) providing the second decoded video signal to both the display as a PIP in the main picture and as a record output signal, using a second clock signal when the second video signal is selected for recording, the second clock signal having a second frequency unrelated to the first frequency, else providing the first decoded video signal to both the display as a PIP in the main picture and as a record output signal using the first clock signal when the first video signal is selected for recording.

2. The method of claim 1, wherein the steps of decoding the first video signal and decoding the second video signal are performed by a common video decoder.

3. The method of claim 1, wherein the first and second video signals are digitally encoded.

4. The method of claim 3, wherein the steps of decoding the first video signal and decoding the second video signal are performed by a common video decoder pipe that is operable to decode video signals encoded in a moving pictures expert group (MPEG) format.

5. An apparatus for monitoring the recording of a video signal comprising:
    a video decoder pipe operable to decode encoded first and second video signals from different video sources;
    a first channel processing circuit coupled to said video decoder pipe and operable to produce a main picture from the first decoded video signal for display using a first clock signal having a first frequency;
    a second channel processing circuit coupled to said video decoder pipe and operable to produce a second decoded video signal;
    selection means for selecting either the first video signal for recording or the second video signal for recording; and
    means for providing the second decoded video signal as both a PIP for display in the main picture and as a record output signal, using a second clock signal when the second video signal is selected for recording, the second clock signal having a second frequency unrelated to the first frequency, and for providing the first decoded video signal both to the display as a PIP in the main picture and as a record output signal using the first clock signal when the first video signal is selected for recording.

6. The apparatus of claim 5, further comprising:
a reference clock generator coupled to said first channel processing circuit and said second channel processing circuit and operable to produce the first clock signal; and
a second channel clock generator coupled to said means for providing and operable to provide a second clock to the second decoded video signal when the second video signal is selected for recording.

7. The apparatus of claim 5, further comprising a digital encoder to produce an analog signal for recording.

8. The apparatus of claim 7, wherein said digital encoder produces an internal vertical synchronization signal when the second video signal is selected for recording, else the digital encoder is operable to receive an externally generated vertical synchronization signal when the first video signal is selected for recording.

9. The apparatus of claim 8, further comprising a vertical synchronization signal generator operable to produce an externally generated vertical synchronization signal based on the first video signal.

10. The apparatus of claim 5, wherein said video decoder pipe is operable to decode video signals encoded in a moving pictures expert group (MPEG) format.

* * * * *